United States Patent
Dautais

(10) Patent No.: US 6,640,828 B2
(45) Date of Patent: Nov. 4, 2003

(54) FLUSHING APPARATUS AND METHOD THEREOF

(76) Inventor: Jean-Pierre Dautais, 73 rue Jean Mermoz, 44340 Bouguenais (FR)

( * ) Notice: Subject to any disclaimer, the term of this patent is extended or adjusted under 35 U.S.C. 154(b) by 176 days.

(21) Appl. No.: 10/003,810

(22) Filed: Nov. 2, 2001

(65) Prior Publication Data

US 2003/0084939 A1 May 8, 2003

(51) Int. Cl.[7] .............................. G05D 9/02; F16K 31/18
(52) U.S. Cl. ..................... 137/403; 137/2; 137/15.26; 137/101.29; 137/397; 137/398; 137/578; 137/579; 137/615; 141/198; 222/533; 222/536; 222/537
(58) Field of Search .................... 137/2, 15.26, 101.29, 137/395, 397, 398, 403, 424, 425, 577, 578, 579, 615, 616; 141/198; 222/67, 533, 536, 537; 405/80, 87

(56) References Cited

U.S. PATENT DOCUMENTS

| | | | | |
|---|---|---|---|---|
| 769,972 A | * | 9/1904 | Wiles | 137/403 |
| 926,842 A | * | 7/1909 | Bartlett | 137/403 |
| 926,843 A | * | 7/1909 | Bartlett | 137/101.29 |
| 947,325 A | * | 1/1910 | Callaway | 137/578 |
| 1,000,619 A | * | 8/1911 | Miller et al. | 137/579 |
| 1,007,176 A | * | 10/1911 | Bartlett | 137/101.29 |
| 1,037,413 A | * | 9/1912 | Bartlett | 137/578 |
| 1,536,061 A | * | 5/1925 | Bartlett | 137/578 |
| 1,536,062 A | * | 5/1925 | Bartlett | 137/578 |
| 2,079,063 A | * | 5/1937 | Brosius | 137/615 |
| 2,178,477 A | * | 10/1939 | Johnson | 137/578 |
| 2,622,736 A | * | 12/1952 | Way | 137/579 |
| 4,305,426 A | * | 12/1981 | Scheid et al. | 137/578 |
| 5,290,434 A | | 3/1994 | Richard | 210/109 |

* cited by examiner

Primary Examiner—George L. Walton
(74) Attorney, Agent, or Firm—St. Onge Steward Johnston & Reens LLC

(57) ABSTRACT

The flushing apparatus comprises a reservoir for storing liquid, the reservoir having an outlet end movable between a raised position where liquid accumulates in the reservoir, and a down position where liquid stored in the reservoir is flushed out; a counterweight for producing an effect of urging the outlet end of reservoir toward the raised position; a reservoir ballast for cancelling the effect of the counterweight when the liquid stored therein reaches a predetermined amount; a channel for channelling a liquid into an inlet of the ballast when the outlet end of the reservoir is in the raised position; and a means for preventing an overflow of the outlet end of the reservoir. There is also provided a method for flushing liquid.

20 Claims, 5 Drawing Sheets

FLUSHING APPARATUS AND METHOD THEREOF

The present invention is concerned with a flushing apparatus and a method thereof. The present invention relates to an apparatus for flushing and distributing predetermined and adjustable volumes of liquid toward one or several surfaces to be used for applications such as water treatment and irrigation.

Known in the art, there is the French patent document published under the publication no. FR 2,760,030. In this document, there is described a flushing system having a float with a horizontal outlet. The float is attached to an outlet tube. The system is supported by a double, hinged cradle which rotates around a horizontal axis according to the water level. The position in which water begins to flow is determined by the balance between the thrust produced by the drainage pipe and the attached float and the total weight of the counterweight. The float is attached to a counterweight with one fixed section which slides over a rod which ensures that the system returns to a height, cutting of the supply to the outlet pipe.

Also known in the art, there is the French patent document no. 2,654,761 which describes a pendulous drainage device comprising at least one outlet pipe mounted movably between an upper position and a lower position, inside a tank supplied with a liquid, and communicating at its lower part with a discharge conduit situated outside the tank. This device is characterised in that the free end of the outlet pipe comprises a buoyancy unit consisting of an annular cell inside which the mouthpiece of the outlet pipe opens.

Also known in the art, there is the French patent document no. 2,654,758 which describes a pendular device for flushing and distributing a liquid. This device comprises at least one drain tube mounted so that it can move between a high position and a low position outside a tank fed by a liquid and communicating at its lower part with the inside of the tank through the use of a siphon. The tube is normally held in a high position inclined with respect to the vertical by means of ballast. The effect of the ballast is cancelled out under the action of the weight of the liquid filling the tube as the level in the tank gradually rises.

Also known in the art, there are systems with siphon. Such system has the drawback of being easily blocked when operating with wastewater.

A drawback with the above-mentioned documents of the prior art is that they do not provide a great flexibility in relation to the water level fluctuation range that is needed for operating the apparatus. Another drawback with the above-mentioned documents of the prior art is that they do not provide a great flexibility for adjusting the mobility of the flushing arm. Another drawback with the above-mentioned documents of the prior art is that the flushing arm is, most of the time, immersed in the liquid to be flushed.

An object of the present invention is to overcome the drawbacks mentioned above.

According to the present invention, there is provided a flushing apparatus comprising a reservoir for storing liquid, the reservoir having an outlet end movable between a raised position where liquid accumulates in the reservoir, and a down position where liquid stored in the reservoir is flushed out; a counterweight for producing an effect of urging the outlet end of reservoir toward the raised position; a reservoir ballast interdependent with the outlet end of the reservoir and moving with the same, the ballast having an inlet for introducing liquid therein when the outlet end of the reservoir is in the raised position, and an outlet for flushing liquid out when the outlet end of the reservoir is in the down position, the ballast cancelling the effect of the counterweight when the liquid stored therein reaches a predetermined amount; a channel for channelling a liquid into the inlet of the ballast when the outlet end of the reservoir is in the raised position; and a means for preventing an overflow of the outlet end of the reservoir.

According to the present invention, there is also provided a method for flushing a predetermined amount of liquid, comprising steps of storing liquid in a reservoir having an outlet end movable between a raised position where liquid accumulates in the reservoir, and a down position where liquid stored in the reservoir is flushed out; urging the outlet end of reservoir toward the raised position by means of a counterweight; urging the outlet end of the reservoir by means of a reservoir ballast when said ballast contains liquid, the reservoir ballast being interdependent with the outlet end of the reservoir and moving with the same; channelling a liquid into an inlet of the ballast when the outlet end of the reservoir is in the raised position; cancelling the effect of the counterweight when the liquid stored in the ballast reaches a predetermined amount to move the outlet end of the reservoir from the raised position to the down position and thereby flushing liquid out of the reservoir and out of the ballast; moving the outlet end of the reservoir back to the raised position by the effect of the counterweight when the predetermined amount of liquid has been flushed; and preventing an overflow of the reservoir when the outlet end is in the raised position.

The objects, advantages and other features of the present invention will become more apparent upon reading of the following non-restrictive description of preferred embodiments thereof, given for the purpose of exemplification only with reference to the accompanying drawings.

DESCRIPTION OF PREFERRED EMBODIMENTS

Figure 1:
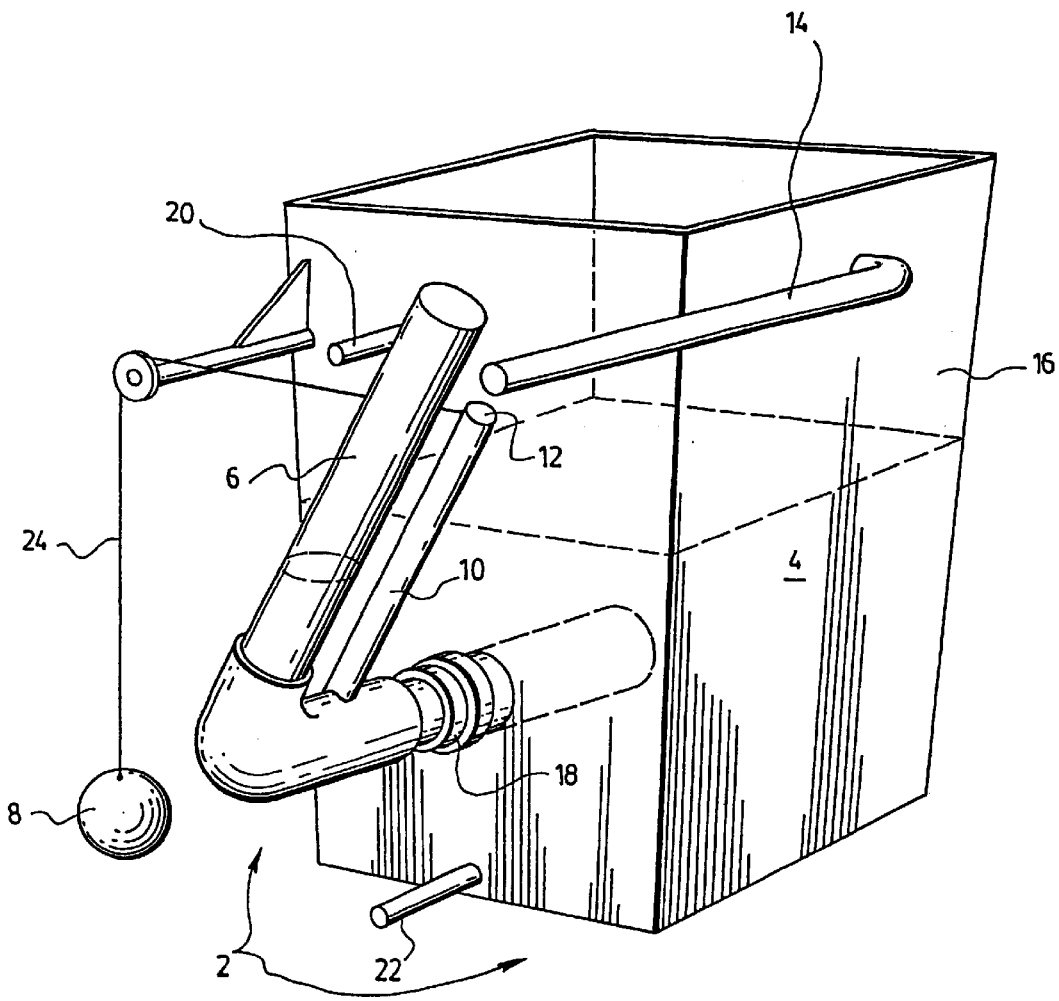
FIG. 1 is a perspective view of a preferred embodiment of the present invention, in a first operating position.
Figure 2:
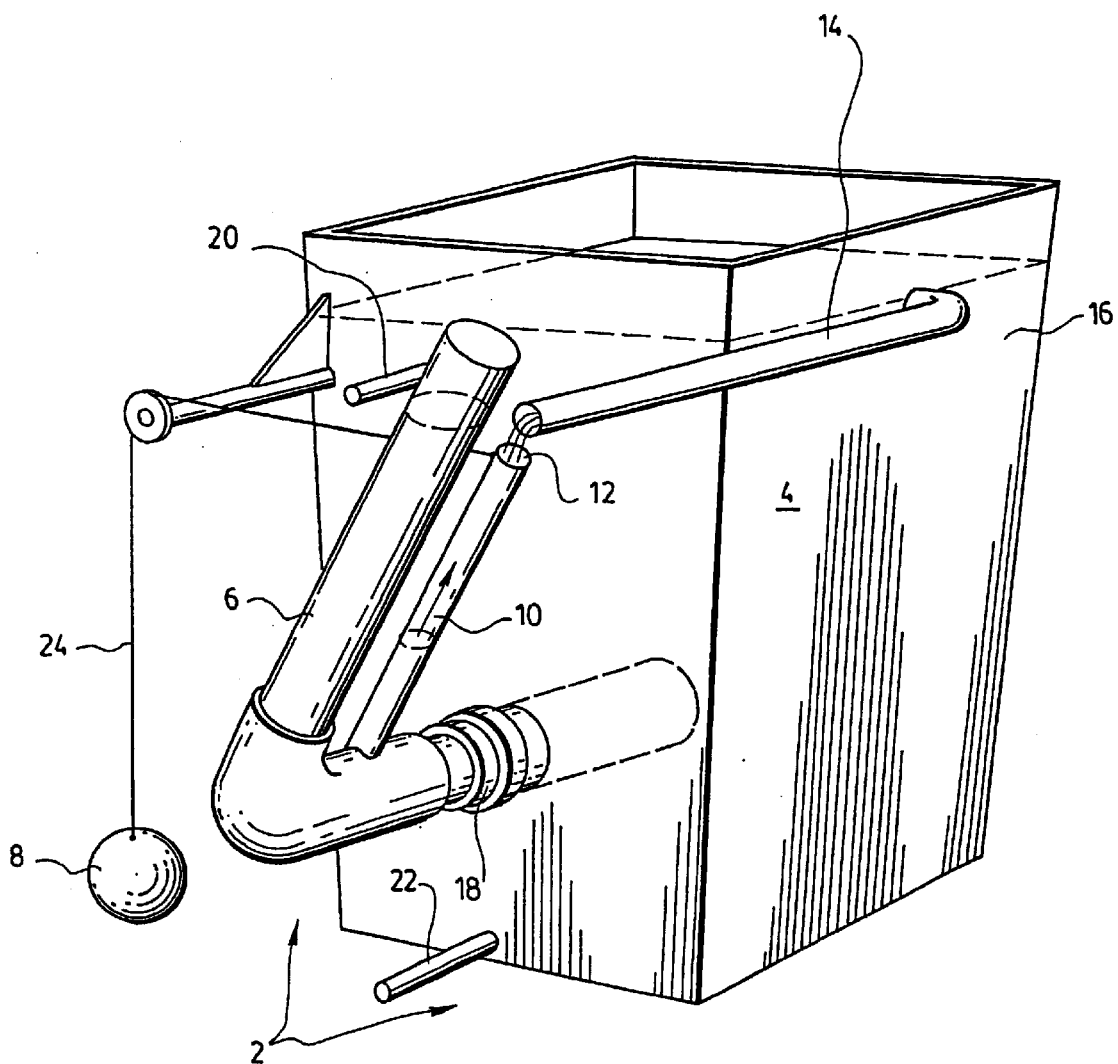
FIG. 2 is a perspective view of the apparatus shown in FIG. 1, in a second operating position.
Figure 3:
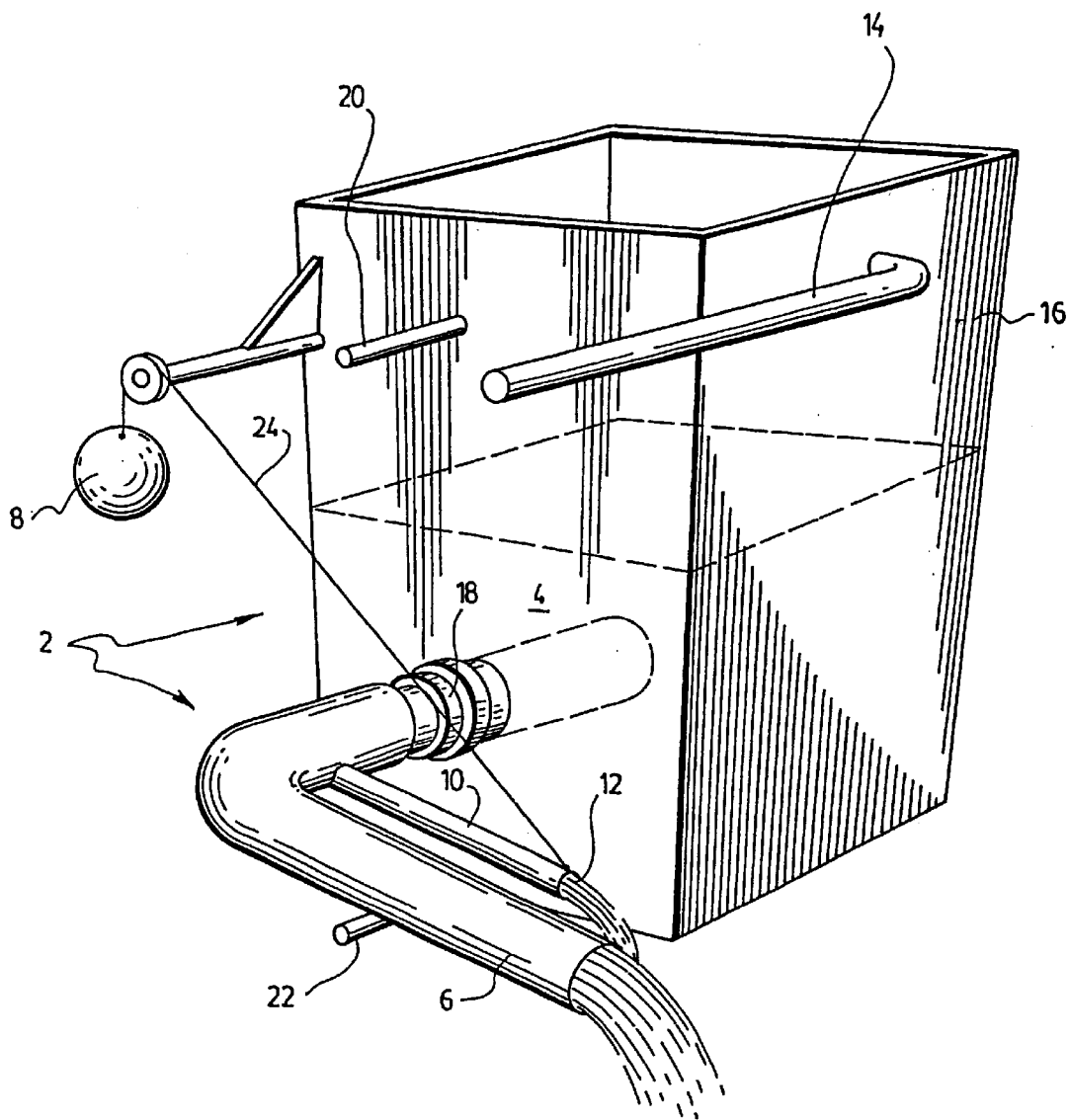
FIG. 3 is a perspective view of the apparatus shown in FIGS. 1 and 2, in a third operating position.

Referring now to FIGS. 1 to 3, there is shown a flushing apparatus according to the present invention. It comprises a reservoir 2 for storing liquid 4. The reservoir 2 has an outlet end 6 movable between a raised position as shown in FIGS. 1 and 2 where liquid 4 accumulates in the reservoir 2, and a down position as shown in FIG. 3 where liquid 4 stored in the reservoir 2 is flushed out.

The apparatus also comprises a counterweight 8 for producing an effect of urging the outlet end 6 of reservoir 2 toward the raised position as shown in FIGS. 1 and 2, and a reservoir ballast 10 interdependent with the outlet end 6 of the reservoir 2 and moving with the same. The ballast 10 has an inlet for introducing liquid therein when the outlet end 6 is in the raised position as shown in FIG. 2, and an outlet for flushing liquid out when the outlet end 6 is in the down position as shown in FIG. 3. Preferably, the ballast 10 is pipe shaped, and the inlet and outlet thereof are made of a single opening 12 located at one of its ends. The ballast 10 cancels the effect of the counterweight 8 when the liquid stored therein reaches a predetermined amount. Preferably, the counterweight 8 is connected to the ballast by means of a rope 24, the effect of the counterweight being produced by gravity force. Preferably, the counterweight can be also embodied with no rope in that it can be a slanted rod provided with a sliding weight for adjusting the counterweight by sliding the weight at different positions along the rod. The angle at which the rod is slanted with respect to a vertical axis can also be adjusted to modify the counterweight effect.

The apparatus also comprises a channel 14 for channelling a liquid into the inlet of the ballast 10 when the outlet end 6 is in the raised position as shown in FIG. 2, and a means for preventing an overflow of the outlet end 6. Preferably, the means for preventing an overflow of the outlet end is embodied by fact that in the raised position the outlet edge of the outlet end 6 is higher than the channel 14 as shown in FIGS. 1 and 2. Preferably, the liquid is directed into the inlet of the ballast 10 by hydrostatic pressure from the reservoir 2.

Preferably, the channel 14 is not connected to the tank 16 as shown in FIG. 1, but it can be connected to the outlet end 6 so that when the liquid reaches a certain level in the outlet end, the ballast 10 begins to be filled by means of a channel connected to the outlet end 6. With this embodiment, it is possible to have a tank that is located at a remote location from the outlet end and the ballast. When the ballast is very far from the tank, according to a preferred embodiment, an independent reservoir with a pump can be used to channel a liquid into the inlet of the ballast independently of the level of liquid in the tank 16.

Preferably, according to another embodiment, the outlet end can be provided with several outlets so that when the outlet end falls to its down position, the water can be distributed to several distinct locations. Furthermore, the different outlets can each have a different diameter or the opening thereof can be controlled by different valves which provide different opening diameters.

For a specific application such as the treatment of wastewater of an isolated house where no electricity is available, the wastewater has to be brought from the septic tank of the house to a system where wastewater is treated. One of the problems is that most of the time, the water level fluctuation range for operating the flushing apparatus that will bring the water from the septic tank to where it is treated, is quite limited. According to a preferred embodiment of the present invention, the apparatus can be operated within a very limited water level fluctuation range in that the tank shown in FIGS. 1 to 3 is replaced by a long storage pipe that brings the water from the septic tank of the house. Of course, the storage pipe has to slope gently down from the septic tank. This storage pipe is used as a tank for containing the water to be flushed. In such embodiment, a small tube is used for channelling liquid by hydrostatic pressure from the storage pipe into the inlet of the ballast. The height of this tube will determine the amount of water that will be flushed. Also, if one wants to increase the amount of water that has to be flushed, the storage pipe can have a section that is laterally enlarged.

Preferably, the reservoir 2 comprises a tank 16 and a pivot joint 18 operatively connecting the outlet end 6 to the tank 16. Also preferably, the apparatus comprises high and low stops 20 and 22 mounted on the reservoir 2 for limiting a course of the outlet end 6 between the raised and down positions. Preferably, the outlet end 6 and the ballast 10 are pipe shaped, and the high stop 20 co-operates with the outlet end 6 to stop it in a position where it is slanted as shown in FIGS. 1 and 2. Preferably, the low stop 22 can be positioned so that when the outlet end is in the down position, it is pivoted in a position that is slightly lower than the horizontal to completely drain said outlet end.

Preferably, according to another embodiment, the pivot joint 18 can be a revolving joint or can be a flexible joint such as bellows. In an embodiment where the flexible joint is embodied by bellows, the location of the ballast with respect to the outlet will determine where the outlet end will fall when the ballast is full of liquid.

Preferably, the opening of the ballast is provided with a valve connected to the tank that lets the liquid flow into the ballast when the pressure thereof has reached a predetermined level. When the ballast pivots with the outlet end, the liquid contained therein is drained.

Preferably, the ballast can be an inflatable bladder located between a fixed structure and the outlet end. The bladder is connected to the reservoir and is inflated either by air or with a liquid when the liquid in the reservoir reaches a given level. As the bladder is inflating, it pushes the outlet end to move it from its raised position to its down position.

Figure 4:
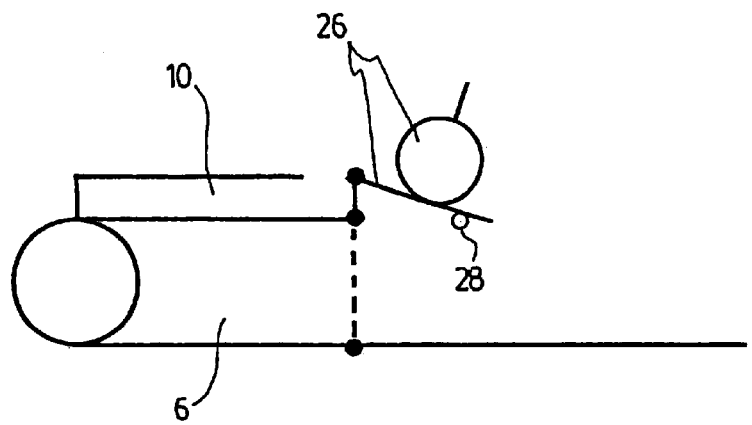
FIG. 4 is a schematic view of a part of an apparatus according to a preferred embodiment of the present invention.

Referring now to FIG. 4, there is shown another preferred embodiment of the means for preventing an overflow of the outlet end 6. This means comprises a valve 26 for closing the outlet end 6, and a wedge 28 for opening the valve 26 as the outlet end 6 falls from the raised position to the down position.

Figure 5:
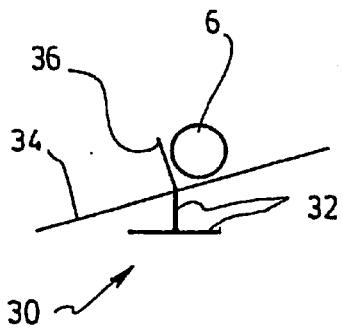
FIG. 5 is a schematic view of a part of an apparatus according to a preferred embodiment of the present invention, in a first operating position.
Figure 6:
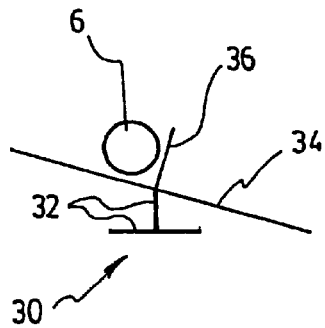
FIG. 6 is a schematic view of the part shown in FIG. 5, in a second operating position.

Referring now to FIGS. 5 and 6, there is shown a preferred embodiment of the apparatus where it further comprises a balance 30 for receiving the outlet end 6 as it falls. The balance 30 includes a base 32, a plate 34 balanced on the base 32 between two stable positions shown respectively on FIGS. 5 and 6, and an upright nose member 36 mounted on an upper surface of the plate 34, adjacent to a point where the plate 34 is balanced on the base 32. The nose member 36 is for receiving the outlet end 6 so that each time it falls from the raised position to the down position the plate 34 is pivoted from one of its positions to the other in order to direct the liquid flushed out of the reservoir in a different one of two directions.

Figure 7:
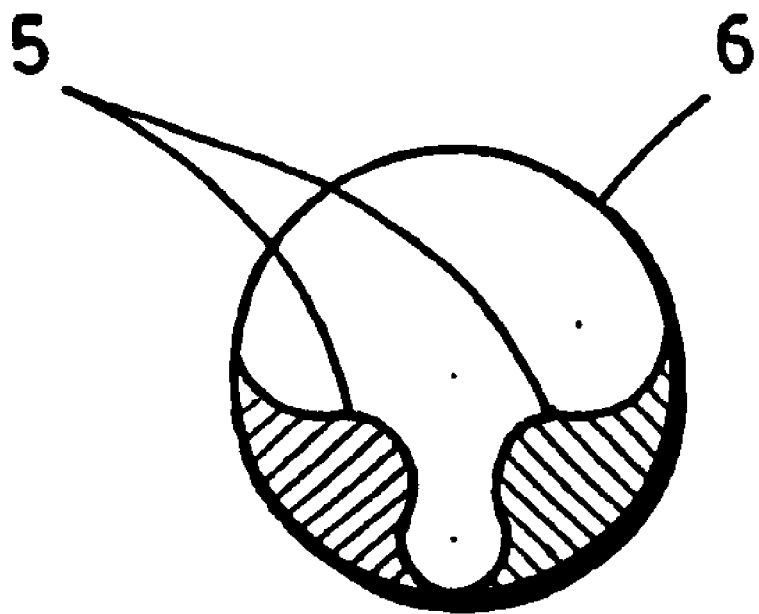
FIG. 7 is a front view of a preferred embodiment of the opening of the outlet end.

Referring now to FIG. 7, there is shown a front view of the opening of the outlet end 6. The opening is provided with two flaps that partially block the lower part thereof. With these flaps, it is possible to delay the moment when the counterweight will bring back the outlet end 6 to its raised position until liquid is almost completely drained from the outlet end 6.

Referring again to FIGS. 1 to 3, according to the present invention there is also provided a method for flushing a predetermined amount of liquid. It comprises steps of storing liquid 4 in a reservoir 2 having an outlet end 6 movable between a raised position where liquid accumulates in the reservoir as shown in FIGS. 1 and 2, and a down position where liquid 4 stored in the reservoir 2 is flushed out as shown in FIG. 3; urging the outlet end 6 toward the raised position by means of a counterweight as shown in FIGS. 1 and 2; urging the outlet end 6 by means of a reservoir ballast 10 when it contains liquid, the reservoir ballast 10 being interdependent with the outlet end 6 and moving with the same; channelling a liquid into an inlet of the ballast 10 when the outlet end 6 is in the raised position; cancelling the effect of the counterweight 8 when the liquid stored in the ballast 10 reaches a predetermined amount to move the outlet end 6 from the raised position to the down position and thereby flushing liquid out of the reservoir and out of the ballast as shown in FIG. 3; moving the outlet end 6 back to the raised position by the effect of the counterweight when the predetermined amount of liquid has been flushed as shown in FIG. 1; and preventing an overflow of the reservoir when the outlet end 6 is in the raised position.

Please note that the present application can also be applied for controlling water accumulated in large reservoirs. The present invention can be used as a safety device for flushing water when the water level in the reservoir reaches a critical height to thereby manage the water stored in the reservoir.

Although preferred embodiments of the invention have been described in detail herein and illustrated in the accompanying drawings, it is to be understood that the invention is not limited to these preferred embodiments and that various changes and modifications may be effected therein without departing from scope or spirit of the invention.

What is claimed is:

1. A flushing apparatus comprising:
   a reservoir for storing liquid, the reservoir having an outlet end movable between a raised position where liquid accumulates in the reservoir, and a down position where liquid stored in the reservoir is flushed out;
   a counterweight for producing an effect of urging the outlet end of reservoir toward the raised position;
   a reservoir ballast interdependent with the outlet end of the reservoir and moving with the same, the ballast having an inlet for introducing liquid therein when the outlet end of the reservoir is in the raised position, and an outlet for flushing liquid out when the outlet end of the reservoir is in the down position, the ballast cancelling the effect of the counterweight when the liquid stored therein reaches a predetermined amount;
   a channel for channelling a liquid into the inlet of the ballast when the outlet end of the reservoir is in the raised position; and
   a means for preventing an overflow of the outlet end of the reservoir.

2. A flushing apparatus according to claim 1, wherein the reservoir comprises a tank and a pivot joint operatively connecting the outlet end to the tank.

3. A flushing apparatus according to claim 2, comprising high and low stops mounted on the reservoir for limiting a course of the outlet end between the raised and down positions.

4. A flushing apparatus according to claim 2, wherein the ballast is pipe shaped, and the inlet and outlet of the ballast being made of a single opening located at one end of the ballast.

5. A flushing apparatus according to claim 2, wherein the means for preventing an overflow of the outlet end comprises a valve for closing the outlet end, and a wedge for opening the valve as the outlet end falls from the raised position to the down position.

6. A flushing apparatus according to claim 2, further comprising a balance for receiving the outlet end as said outlet end falls, the balance including a base, a plate balanced on the base between two stable positions, and an upright nose member mounted on an upper surface of the plate, adjacent to a point where the plate is balanced on the base, the nose member being for receiving the outlet end so that each time said outlet end falls from the raised position to the down position the plate is pivoted from one of its positions to the other in order to direct the liquid flushed out of the reservoir in a different one of two directions.

7. A flushing apparatus according to claim 1, comprising high and low stops mounted on the reservoir for limiting a course of the outlet end between the raised and down positions.

8. A flushing apparatus according to claim 7, wherein the ballast is pipe shaped, and the inlet and outlet of the ballast being made of a single opening located at one end of the ballast.

9. A flushing apparatus according to claim 1, wherein the channel directs the liquid into the inlet of the ballast by hydrostatic pressure from the reservoir.

10. A flushing apparatus according to claim 9, wherein the ballast is pipe shaped, and the inlet and outlet of the ballast being made of a single opening located at one end of the ballast.

11. A flushing apparatus according to claim 10, wherein the means for preventing an overflow of the outlet end is embodied by fact that in the raised position the outlet end of the reservoir has an outlet edge that is higher than the channel.

12. A flushing apparatus according to claim 9, wherein the means for preventing an overflow of the outlet end is embodied by fact that in the raised position the outlet end of the reservoir has an outlet edge that is higher than the channel.

13. A flushing apparatus according to claim 1, wherein the counterweight is connected to the ballast by means of a rope, the effect of the counterweight being produced by gravity force.

14. A flushing apparatus according to claim 13, wherein the ballast is pipe shaped, and the inlet and outlet of the ballast being made of a single opening located at one end of the ballast.

15. A flushing apparatus according to claim 13, wherein the means for preventing an overflow of the outlet end comprises a valve for closing the outlet end, and a wedge for opening the valve as the outlet end falls from the raised position to the down position.

16. A flushing apparatus according to claim 1, wherein the ballast is pipe shaped, and the inlet and outlet of the ballast being made of a single opening located at one end of the ballast.

17. A flushing apparatus according to claim 16, wherein the means for preventing an overflow of the outlet end comprises a valve for closing the outlet end, and a wedge for opening the valve as the outlet end falls from the raised position to the down position.

18. A flushing apparatus according to claim 1, wherein the means for preventing an overflow of the outlet end comprises a valve for closing the outlet end, and a wedge for opening the valve as the outlet end falls from the raised position to the down position.

19. A flushing apparatus according to claim 1, further comprising a balance for receiving the outlet end as said outlet end falls, the balance including a base, a plate balanced on the base between two stable positions, and an upright nose member mounted on an upper surface of the plate, adjacent to a point where the plate is balanced on the base, the nose member being for receiving the outlet end so that each time said outlet end falls from the raised position to the down position the plate is pivoted from one of its positions to the other in order to direct the liquid flushed out of the reservoir in a different one of two directions.

20. A method for flushing a predetermined amount of liquid, comprising steps of:

storing liquid in a reservoir having an outlet end movable between a raised position where liquid accumulates in the reservoir, and a down position where liquid stored in the reservoir is flushed out;

urging the outlet end of reservoir toward the raised position by means of a counterweight;

urging the outlet end of the reservoir by means of a reservoir ballast when said ballast contains liquid, the reservoir ballast being interdependent with the outlet end of the reservoir and moving with the same;

channelling a liquid into an inlet of the ballast when the outlet end of the reservoir is in the raised position;

cancelling the effect of the counterweight when the liquid stored in the ballast reaches a predetermined amount to move the outlet end of the reservoir from the raised position to the down position and thereby flushing liquid out of the reservoir and out of the ballast;

moving the outlet end of the reservoir back to the raised position by the effect of the counterweight when the predetermined amount of liquid has been flushed; and preventing an overflow of the reservoir when the outlet end is in the raised position.

* * * * *